US009651028B2

(12) United States Patent
Møller

(10) Patent No.: US 9,651,028 B2
(45) Date of Patent: May 16, 2017

(54) SYSTEM AND METHOD TO PROVIDE FOR ACCURATE ALIGNMENT WHEN MOUNTING A WIND TURBINE BLADE

(71) Applicant: LM WP PATENT HOLDING A/S, Kolding (DK)

(72) Inventor: Thomas Møller, Sjølund (DK)

(73) Assignee: LM WP PATENT HOLDINGS A/S, Kolding (DK)

( * ) Notice: Subject to any disclaimer, the term of this patent is extended or adjusted under 35 U.S.C. 154(b) by 340 days.

(21) Appl. No.: 14/409,236

(22) PCT Filed: Jun. 24, 2013

(86) PCT No.: PCT/EP2013/063101
§ 371 (c)(1),
(2) Date: Dec. 18, 2014

(87) PCT Pub. No.: WO2013/190140
PCT Pub. Date: Dec. 27, 2013

(65) Prior Publication Data
US 2015/0167641 A1    Jun. 18, 2015

(30) Foreign Application Priority Data
Jun. 22, 2012   (EP) .................... 12173100

(51) Int. Cl.
*F03D 1/06*    (2006.01)
*F03D 11/00*   (2006.01)
*F03D 80/70*   (2016.01)

(52) U.S. Cl.
CPC ........ *F03D 11/0008* (2013.01); *F03D 1/0658* (2013.01); *F03D 1/0675* (2013.01);
(Continued)

(58) Field of Classification Search
CPC .. F03D 1/0658; F03D 1/0675; F03D 11/0008; F03D 80/70; F05B 2230/604;
(Continued)

(56) References Cited

U.S. PATENT DOCUMENTS 4,236,873 A  * 12/1980  Sherman ............... F03D 1/0658
                                                            416/204 R
4,915,590 A  *  4/1990  Eckland ................ F03D 1/0658
                                                             29/889.21
(Continued)

FOREIGN PATENT DOCUMENTS

DE    102009015073 A1    10/2010
EP         1959129 A2     8/2008
(Continued)

*Primary Examiner* — Igor Kershteyn
(74) *Attorney, Agent, or Firm* — Nath, Goldberg & Meyer; Jerald L. Myer; Tanya E. Harkins

(57) ABSTRACT

A system and method of mounting a wind turbine blade is described, designed to aid in the guiding and alignment of wind turbine blade roots with hub-side components, e.g. a blade pitch system. Furthermore, the system is operable to reduce the effect of blade root ovalization. At least one circular collar is provided which can bear against at least a section of the mounting elements, e.g. blade root bushings, projecting from the root end of a wind turbine blade. The collar acts to absorb the forces pushing the blade root towards an oval shape, thereby providing for improved handling of blade root ovalization and ensuring accurate radial alignment of mounting elements, e.g. stay bolt bores and blade root bushings. Such an improved alignment system reduces the likelihood of bolt failure as a result of component misalignments.

10 Claims, 4 Drawing Sheets

Figure 1:
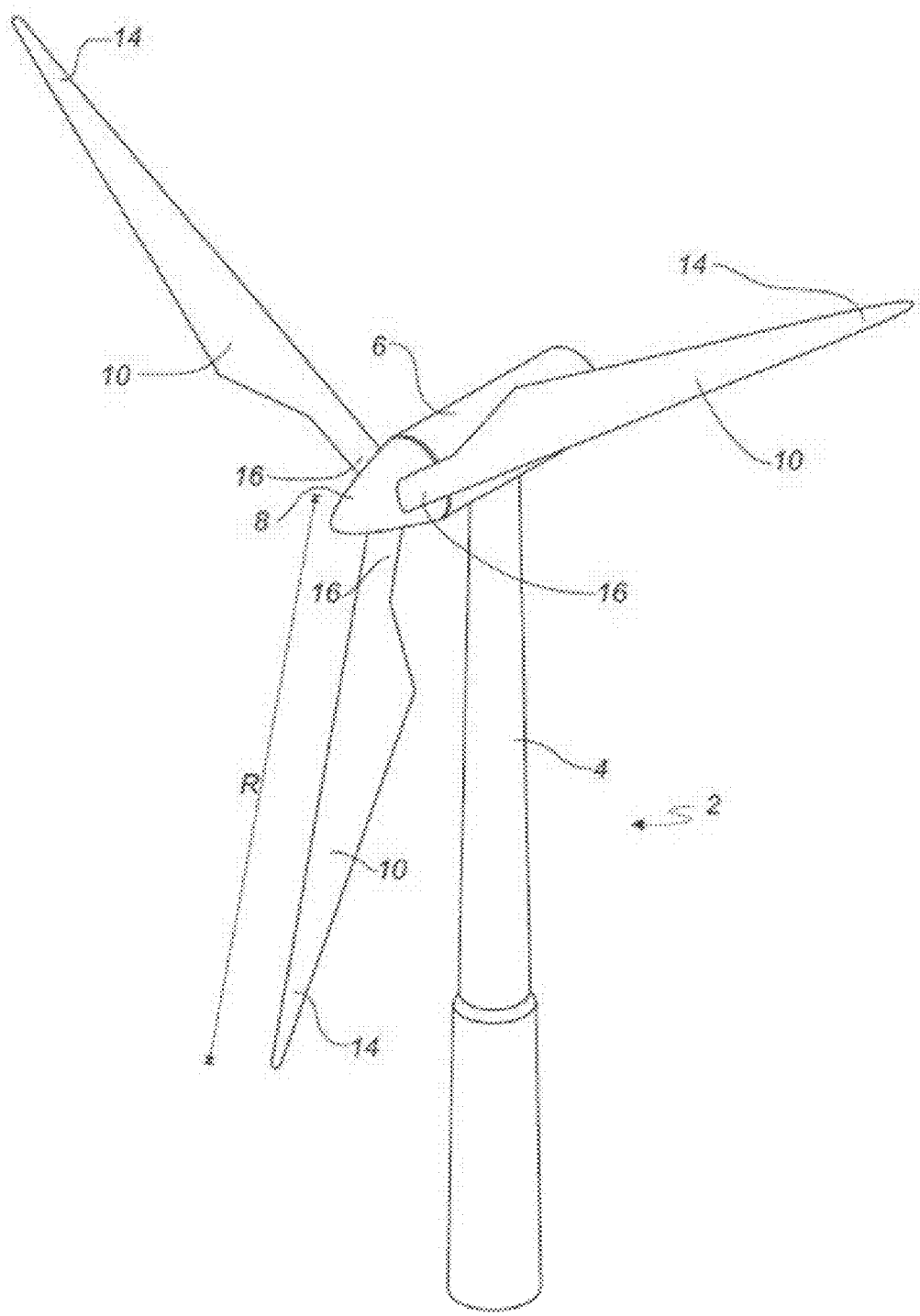

(52) U.S. Cl.
CPC ........ *F03D 80/70* (2016.05); *F05B 2230/604* (2013.01); *F05B 2260/301* (2013.01); *Y02E 10/721* (2013.01); *Y02P 70/523* (2015.11); *Y10T 29/4932* (2015.01)

(58) Field of Classification Search
CPC ............. F05B 2260/301; Y02E 10/721; Y02P 70/523; Y10T 29/4932
See application file for complete search history.

(56) References Cited

U.S. PATENT DOCUMENTS

| | | | | |
|---|---|---|---|---|
| 5,458,465 | A | * | 10/1995 | von Wieser ........... F04D 29/023 416/214 R |
| 2007/0154317 | A1 | * | 7/2007 | Cairo ................... F03D 1/0658 416/230 |
| 2011/0142618 | A1 | | 6/2011 | Moore |
| 2011/0243738 | A1 | * | 10/2011 | Andersen .............. F03D 1/0658 416/147 |
| 2011/0278851 | A1 | | 11/2011 | Fujioka |

FOREIGN PATENT DOCUMENTS

| | | | |
|---|---|---|---|
| EP | 2372149 | A1 | 10/2011 |
| EP | 2453129 | A1 | 5/2012 |
| WO | 2009/151181 | A1 | 12/2009 |

* cited by examiner

SYSTEM AND METHOD TO PROVIDE FOR ACCURATE ALIGNMENT WHEN MOUNTING A WIND TURBINE BLADE

This is a National Phase Application filed under 35 U.S.C. 371 as a national stage of PCT/EP2013/063101, filed Jun. 24, 2013, and claims priority benefit from European Application No. 12173100.4, filed Jun. 22, 2012, the content of which is hereby incorporated by reference in its entirety.

FIELD OF THE INVENTION

The present invention relates to a system and associated method for the mounting of a wind turbine blade to a wind turbine hub to provide for improved root end alignment and improve handling of blade root ovalisation.

BACKGROUND OF THE INVENTION

Wind turbines have become a preferred source of renewable energy in the developed world, resulting in a continued effort to improve turbine output and efficiency. This has lead to development and production of physically larger wind turbine designs.

Due to the continual increase in component size, modern wind turbines can experience mechanical problems not previously an issue with smaller-dimensioned designs. One of these issues is that of blade root ovalisation.

A wind turbine blade root generally comprises a plurality of connecting elements projecting from the circular root end, e.g. blade root bushings, stay bolts, flanges, etc., for connection of the wind turbine blade to a wind turbine hub, wind turbine hub extender and/or pitch system. As stay bolts are normally used to bear the considerable forces involved in the mounting of a wind turbine blade, it is essential that such stay bolts are connected between wind turbine components with a high degree of accuracy. Any misalignment between stay bolts and/or apertures to receive such stay bolts can result in stay bolts provided in blade root bushings to touch or brush against the side of the root bushing, the root flange, and/or the pitch bearing. Such a direct contact can have a serious effect on the dynamic strength of the stay bolt, and it must be avoided to avoid untimely failure of stay bolt connections.

Furthermore, a known problem in wind turbine manufacture is blade root ovalisation after blade moulding, wherein the natural forces present in a blade root section act to force the nominally circular blade root towards an oval shape. Such a ovalisation considerably complicates the act of accurate alignment of blade root components during mounting or coupling operations.

Current construction methods can involve the use of a jacking mechanism to jack sections of the wind turbine blade root to assume a circular shape, to aid with the mounting of the blade root flange, and/or when subsequently mounting the blade on the turbine. However, such a system does not provide for an even roundness of the root end, which can result in misalignments between blade root components. Further, once the jacking force is removed, the blade root end will act to return to the natural oval shape.

An example of a prior art system for wind turbine blade mounting is provided in EP 2 453 129, which uses guiding bushings having a tapered end to guide a blade root with respect to a mounting flange.

It is an object of the invention to provide a method and system which allows for improved alignment of blade root ends with subsequent wind turbine components, as well as for minimising the effects of wind turbine blade root ovalisation, thereby improving the durability of wind turbine components.

SUMMARY OF THE INVENTION

Accordingly, there is provided a wind turbine comprising a rotor having a substantially horizontal rotor shaft, the rotor comprising a hub and at least one wind turbine blade extending in a substantially radial direction therefrom, the wind turbine blade having a tip end and a substantially circular root end, wherein a plurality of bushings project from said root end of said at least one wind turbine blade for mounting said at least one wind turbine blade to a hub, an extender, or a pitch ring coupled to said rotor, wherein a corresponding plurality of apertures are defined on a mounting surface of said hub, extender, or pitch ring, the apertures and the bushings arranged to receive a plurality of bolts to mount said at least one wind turbine blade to said hub, extender, or pitch ring, wherein said wind turbine comprises at least one guiding surface extending adjacent said apertures, the guiding surface acting to align said bushings with said apertures such that a free end of said bushings bear against the mounting surface adjacent said apertures, and wherein said guiding surface is substantially orthogonal to said mounting surface.

As the guiding surface is substantially orthogonal to the mounting surface, an improved mounting system for a wind turbine blade is provided. This results in numerous advantages over the prior art, as it allows for easier manufacturing and machining of parts to have co-operating surfaces, as well as providing for more effective transfer of loads and bearing forces between the bushings and the mounting and guiding surfaces.

Additionally or alternatively, said bushings project from the root end of said at least one wind turbine blade by a first height, and said guiding surface is provided by at least one circular collar, wherein said circular collar projects from the mounting surface by a second height, wherein said first height is greater than said second height, such that a space is defined between said root end and said at least one circular collar.

The circular collar is provided adjacent the hub, extender, or pitch ring. It will be understood that the circular collar may be formed integrally with the hub, extender, or pitch ring. As the bushings project from the blade root end by a greater distance than the circular collar projects from the hub-side element, accordingly the root end of the blade is prevented from direct contact with the circular collar.

Preferably, the wind turbine blade is substantially formed from a fibre composite material, and the circular collar and hub, extender, or pitch ring are substantially formed from a metallic material.

The prevention of direct contact between the fibre-composite root end and a metallic mounting element reduces the possibility of root end damage occurring due to the abrasion between the two different materials.

Preferably, at least one resilient seal or spacer element is provided between the root end of said at least one blade and said guiding surface. This may comprise a rubber ring or flexible tube applied on the circular collar or on the blade root end.

The use of a seal or spacer element can prevent the ingress of moisture, as well as further ensuring that there is no direct contact between the fibre-composite blade root and the metallic circular collar or pitch ring.

In one aspect, a portion of the guiding surface is chamfered, preferably that portion of the guiding surface distal from said mounting surface, preferably less than 50% of the height of the guiding surface.

By providing a chamfered portion at the free end of the guiding surface, the bushings can be more easily aligned with the hub-side apertures for mounting. However, it is to be understood that the main portion of the guiding surface is arranged orthogonal to the mounting surface.

There is also provided a wind turbine comprising a rotor having a substantially horizontal rotor shaft, the rotor comprising a hub, from which at least one wind turbine blade extends substantially in a radial direction when mounted to the hub, the wind turbine blade extending in a longitudinal direction parallel to a longitudinal axis and having a tip end and a substantially circular root end, wherein a plurality of coupling or mounting elements project from said root end of said at least one wind turbine blade, said root end mounting elements arranged to couple the root end of said wind turbine blade to a plurality of corresponding hub-side mounting elements provided on or connected to said hub, and wherein the wind turbine further comprises at least one collar, preferably a circular collar, located between said root end and said hub, wherein said at least one collar acts to bear against at least a portion of said plurality of mounting elements projecting from said root end, to align said plurality of root end mounting elements with said plurality of hub-side mounting elements.

The circular collar may be dimensioned to provide for a close alignment between the root end mounting elements and corresponding hub-side mounting elements provided on or coupled to the hub, minimising the risk of misalignment between the blade mounting elements and the hub mounting elements. The circular collar can also aid in guiding said root end mounting elements to couple with said hub-side mounting elements. Furthermore, the use of a circular collar adjacent the mounting elements projecting from the blade root end means that the notional ring of mounting elements, along with the associated blade root end, are prevented from excessive ovalisation.

The root end mounting elements may comprise any suitable array of elements projecting from the root end of a wind turbine blade which are used to mount or couple a wind turbine blade to the greater wind turbine structure, for example: a flange member, a projecting bolt, a projecting blade sleeve, and/or a projecting end of a blade root bushing embedded in the wind turbine blade root end. The corresponding hub-side mounting elements provided on or coupled to the hub will be understood to include any suitable connection capable of coupling with the root end mounting elements, e.g. an aperture or bore for receiving a bolt. It will be understood that the wind turbine blades are preferably in excess of at least 30 meters in length.

In a particularly preferred embodiment, said root end mounting elements comprise a plurality of blade root bushings provided around said root end in a notional bolt circle, and said hub-side mounting elements comprise a plurality of bolt apertures defined in a hub-side body provided on or coupled to said hub, wherein said blade root bushings are arranged to receive a plurality of bolts which extend through said bolt apertures to secure said root end to said hub-side body, wherein said at least one circular collar is arranged to align said plurality of blade root bushings with said plurality of bolt apertures to prevent bolt misalignment.

By bearing against the root bushings of the blade root, the circular collar is able to maintain the radial alignment on the stay bolts and the shape of the blade root, to prevent the bolts from coming into undesired contact with the side of the root bushing, a blade root flange, and/or the hub-side body, e.g. a pitch ring or pitch bearing. This acts to reduce the chances of bolt failure during the desired operational lifetime of the wind turbine blade.

In one embodiment, a first open end of each of said plurality of bolt apertures is defined on a blade root-facing surface of said hub-side body, wherein said at least one circular collar is provided adjacent said blade root-facing surface, said at least one circular collar having a bushing-facing bearing surface to bear against at least a plurality of said blade root bushings, wherein the diameter of said at least one circular collar is selected such that the distance between said bushing-facing bearing surface and said first open end of said plurality of bolt apertures is equal to the wall width of the blade root bushings plus a tolerance value, such that said plurality of bolt apertures are substantially aligned with the plurality of blade root bushings.

As there may be variations in manufacturing tolerances and/or different system requirements for different designs of wind turbines produced by different manufacturers, preferably the dimensions of the at least one circular collar are designed to take account of such tolerances, to reduce the possibility that manufacturing variances may affect the operation of the system. Preferably, the centreline of the bolt apertures are aligned with the centreline of the blade root bushings.

It will be understood that the tolerance value may be based on a selection of at least one of the following: a bolt flexibility tolerance value, a bolt diameter tolerance value, a bushing side wall dimension tolerance value, a bolt aperture dimension tolerance value, etc. Preferably, said bolt diameter tolerance value is approximately 0.05%-0.1% of the bolt diameter. Preferably, said bushing side wall dimension tolerance value is approximately 0.05%-0.1% of the bushing side wall width. Preferably, said bolt aperture dimension tolerance value is approximately 0.05%-0.1% of the diameter of said bolt aperture.

It will be understood that said hub-side body may comprise any element suitable for the coupling of a wind turbine blade to a wind turbine hub, e.g. a hub extender, a pitch system, a coupling flange integral to the hub, etc.

Preferably, said at least one circular collar is formed of a relatively stiff, high-strength material, e.g. a metallic element, e.g. steel.

Preferably, the diameter of said at least one circular collar substantially approximates the diameter of the notional circle defined by said plurality of mounting elements projecting from said root end.

The diameter of the circular collar is preferably selected to allow for a close fit between the circular collar and the notional circle defined by the projecting mounting elements. As the diameter of the circular collar closely follows the diameter of the initial root end circle, this prevents excessive deviation of the shape of the notional circle, and the associated blade root end, from the original preferred shape due to blade root ovalisation.

In one embodiment, the diameter of said at least one circular collar is within approximately 5% of the diameter of said notional circle defined by said plurality of mounting elements projecting from root end, preferably within 2%, further preferably within 1%.

This close alignment of the respective circle diameters prevents the occurrence of excessive blade root ovalisation, and helps to accurately align the blade mounting elements with the appropriate hub-side mounting elements.

Preferably, said wind turbine comprises a pitch system having a first pitch ring arranged between said wind turbine blade and said hub, wherein said plurality of mounting elements are coupled to said first pitch ring, said pitch system operable to pitch said wind turbine blade relative to said hub, wherein said at least one circular collar is provided on said first pitch ring.

The use of the pitch system to carry the circular collar provides a basis for a system which can be relatively easily incorporated into existing wind turbine designs without significant redesign or reconfiguration. Furthermore, as blade pitch systems generally comprise relatively large structures, e.g. metallic rings of at least 1 meter diameter, such systems can be sufficiently strong to bear the forces involved in blade ovalisation and bending.

Preferably, said mounting elements are directly coupled to said first pitch ring, e.g. by bolting.

In one aspect, said first pitch ring may comprise a reinforcing element, e.g. a brace or bracket extending between opposed sides of said first pitch ring to prevent deformation of said first pitch ring.

The strength of the pitch ring may be increased through the use of reinforcing brackets or members to provide for a better distribution of force in the pitch ring.

In one aspect, said first pitch ring comprises at least one circular collar integral with the body of the pitch ring.

The pitch ring may be manufactured to have the circular collar an integrated part of the pitch system body.

Alternatively, the wind turbine comprises at least one circular collar fitted to said first pitch ring.

The collar may be retrofitted to an existing pitch system, e.g. using bolting, adhesives, and/or a snap fit connection. Additionally or alternatively, the collar may be coupled to the pitch ring using a simple push-fit connection, wherein a projecting portion of the collar is dimensioned to substantially correspond to the inner and/or outer circumference of the pitch ring, the projecting portion fitted about at least a section of the external and/or internal circumference of said first pitch ring.

In one embodiment, the wind turbine comprises an inner circular collar located internal to the circumference of the notional circle defined by said plurality of mounting elements projecting from the substantially circular blade root end, said inner circular collar acting to bear against at least a portion of said plurality of mounting elements to retain the substantially circular shape of said root end and prevent ovalisation of said root end.

Additionally or alternatively, the wind turbine comprises an outer circular collar located external to the circumference of the notional circle defined by said plurality of mounting elements projecting from the substantially circular blade root end, said outer circular collar acting to bear against at least a portion of said plurality of mounting elements to retain the substantially circular shape of said root end and prevent ovalisation of said root end.

Preferably, the wind turbine comprises both internal and external collars, said collars defining a channel therebetween to receive at least a portion of said plurality of mounting elements projecting from said blade root end.

The use of a pair of collars located on either side of the notional circle of mounting elements can provide for increased ease during the guiding and alignment of the mounting elements for coupling with the wind turbine hub.

Preferably, said at least one circular collar comprises a bearing surface arranged to bear against at least a portion of said plurality of mounting elements, wherein said bearing surface is at least partially chamfered.

The provision of a chamfered surface aids in the insertion of said mounting elements relative to said collar.

Preferably, said at least one circular collar comprises a bearing surface to bear against said at least a portion of said plurality of root end mounting elements, wherein said at least one circular collar is provided on a hub-side body provided on or coupled to said hub, the bearing surface having a width projecting from a blade root-end facing surface of said hub-side body, wherein the length by which said plurality of root end mounting elements project from said root end is greater than the width of said bearing surface, wherein a free end of said plurality of root end mounting elements bear against said surface of said hub-side body such that a space is defined between said root end and said at least one circular collar.

As wind turbine blades generally are formed of a fibre-based composite material, direct contact between the composite material and a rigid, e.g. metallic, collar may result in damage or fraying to the end of the wind turbine blade, e.g. microfractures in the laminate material of the blade. Accordingly, the appropriate dimensioning of the collar with regard to the projection length of the root end mounting elements will ensure that no direct contact occurs between the appropriate surfaces.

In one aspect, the mounting elements may comprise root bushings which project approximately 10-15 mm from the root end of the wind turbine blade. The circular collar may have a bearing surface width of between 5-10 mm. The circular collar may further comprise a chamfered edge having a depth of approximately 3 mm.

Preferably, the wind turbine comprises at least one sealing element provided between the root end of said wind turbine blade and said at least one circular collar. Preferably, said at least one sealing element forms at least a portion of a seal between said root end of said wind turbine blade and said at least one circular collar.

Preferably, said at least one sealing element is provided as a ring element, e.g. an o-ring, wherein said at least one sealing element forms a seal between said root end of said wind turbine blade and said at least one circular collar.

The use of a sealing element as a seal between the blade and the collar prevents the ingress or moisture, etc. into the wind turbine interior. Preferably, said at least one sealing element is formed from a resilient material, e.g. a rubber or plastics material.

In one embodiment, the wind turbine blade is formed from a fibre-based material and said at least one circular collar is formed from a metallic element, preferably steel, and wherein the method further comprises the step of providing at least one spacer element or protective element, preferably formed of a flexible or resilient material, located between the root end of said wind turbine blade and said at least one circular collar, to prevent contact between said wind turbine blade and said at least one circular collar.

The use of a dedicated spacer element or protective element provides for increased certainty that there is no direct contact between the blade root end and the circular collar. It will be understood that the spacer element may be formed from any suitable resilient material, operable to prevent direct contact between the blade root end and the hub-side components of the wind turbine structure.

Alternatively, a plurality of spacer elements are provided between said root end and said at least one circular collar.

In one embodiment, said plurality of spacer elements are provided as o-rings provided around respective mounting elements projecting from said root end.

It will be understood that, additionally or alternatively, the mounting elements are coupled to a hub extender provided on said hub, wherein said at least one circular collar is provided on or coupled to said hub extender.

There is further provided a method for preventing ovalisation of a wind turbine blade root end, the wind turbine blade comprising a substantially circular root end having a plurality of coupling or mounting elements projecting therefrom, the method comprising the step of:

providing at least one collar, preferably a circular collar, to bear against at least a portion of said plurality of mounting elements projecting from said root end, to retain the substantially circular shape of said root end and prevent ovalisation of said root end.

The mounting elements may comprise any suitable array of element projecting from the root end of a wind turbine blade which are for use in the action of mounting or coupling a wind turbine blade to a greater wind turbine structure, for example a flange member, a projecting bolt, a projecting blade sleeve, and/or a projecting end of a blade root bushing embedded in the wind turbine blade root end.

In particular, there is provided a method of coupling a wind turbine blade to a wind turbine hub, the wind turbine blade comprising a root end having a substantially circular root end having a plurality of root end bushings projecting therefrom, wherein the method comprises the step of:

providing at least one collar, preferably a circular collar, to bear against at least a portion of said plurality of root bushings projecting from said root end to retain the substantially circular shape of said root end and to align said root bushings with a plurality of mounting elements provided on a wind turbine hub.

The use of such a method furthermore acts to provide an improved system for the handling of ovalisation of said root end.

Preferably, said step of providing comprises providing said at least one circular collar on a pitch ring of a wind turbine blade pitch system.

In one aspect, the method comprises the step of providing a wind turbine blade pitch system comprising a pitch ring having at least one integral circular collar.

Alternatively, the method comprises the step of fitting said at least one circular collar to a pitch ring of a wind turbine blade pitch system.

DESCRIPTION OF THE INVENTION

Figure 2:
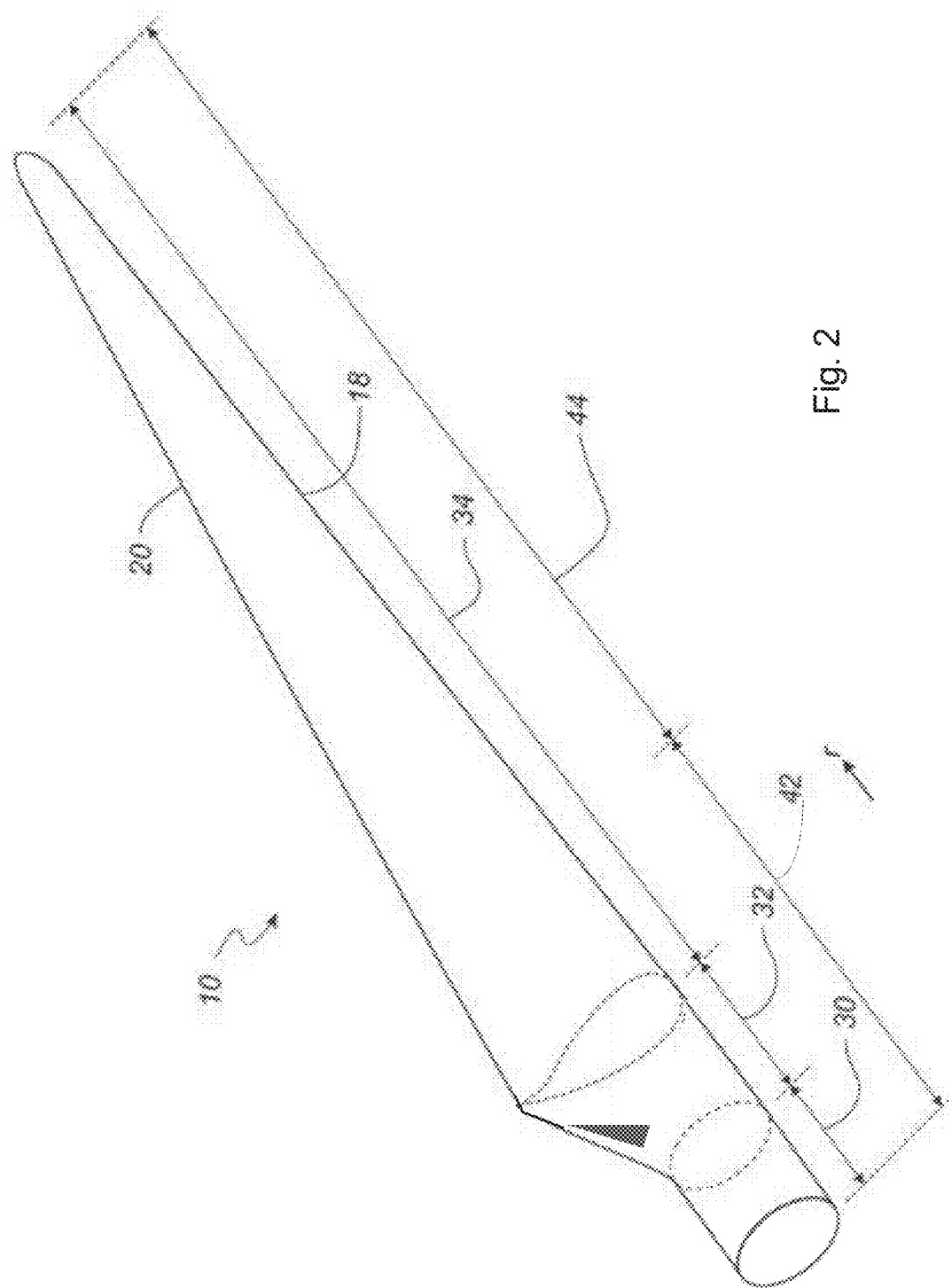
Figure 3:
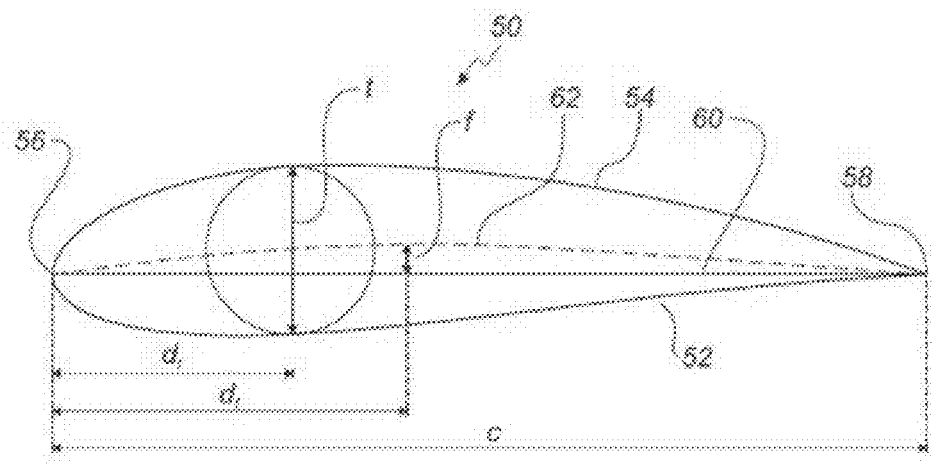
Figure 4:
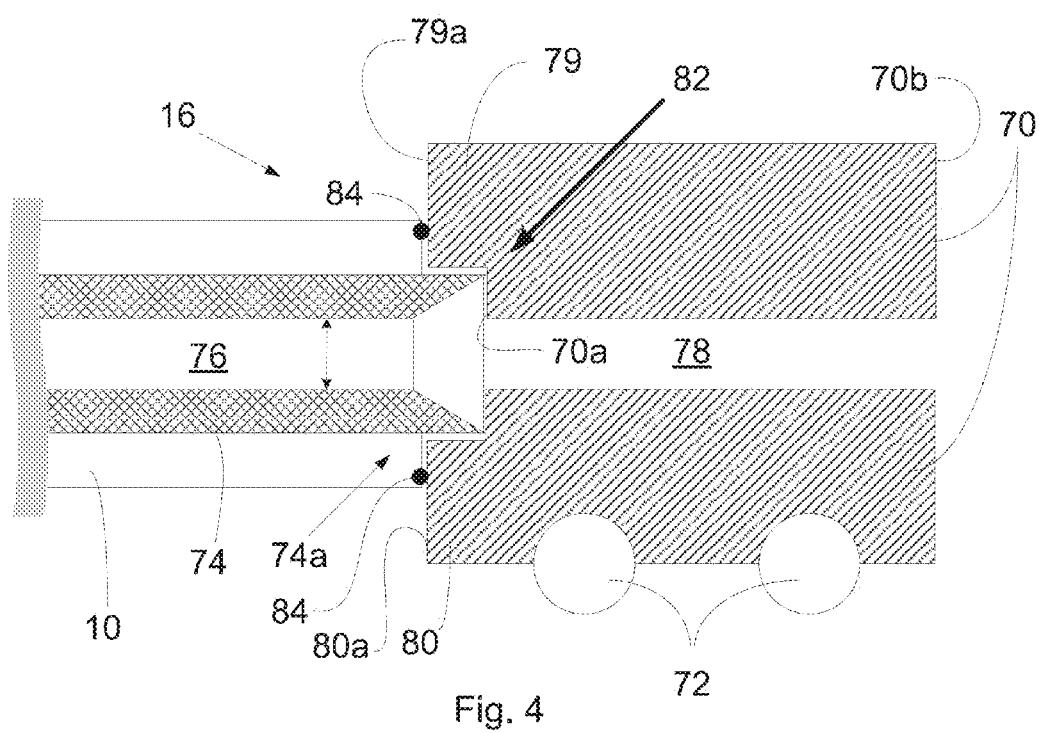
Figure 5:
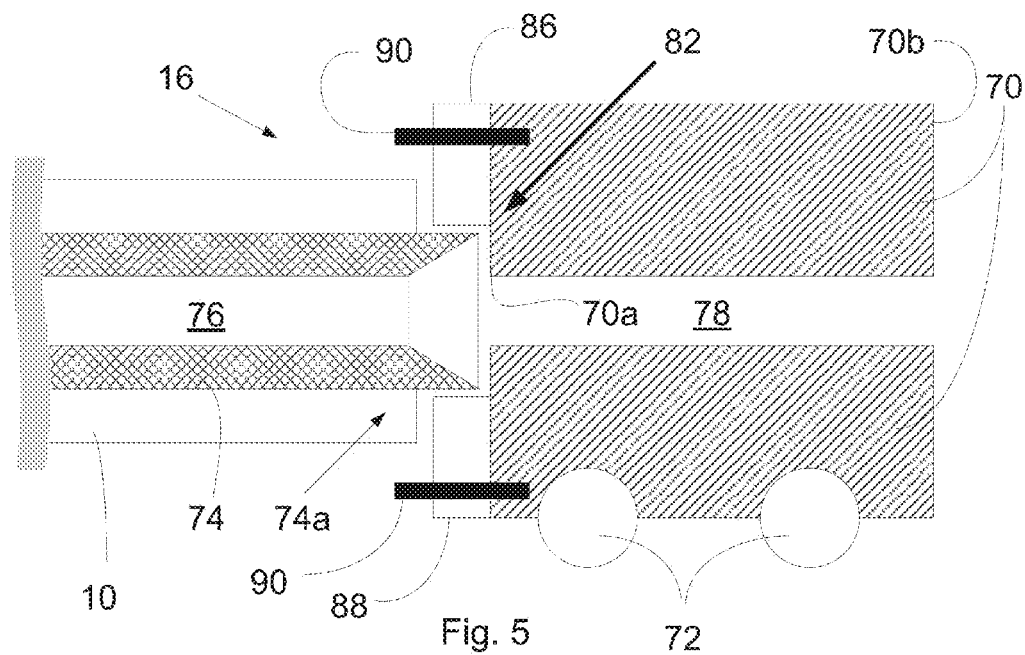
Figure 6:
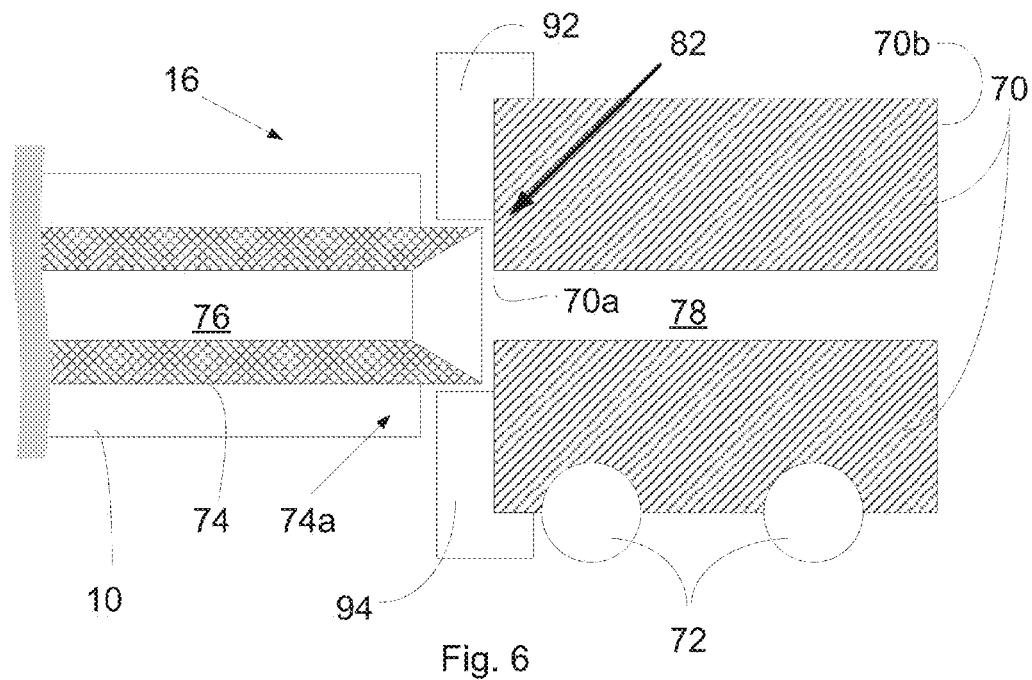

Embodiments of the invention will now be described, by way of example only, with reference to the accompanying drawings, in which:

FIG. 1 shows a wind turbine;
FIG. 2 shows a schematic view of a wind turbine blade;
FIG. 3 shows a schematic view of an airfoil profile of the blade of FIG. 2;
FIG. 4 illustrates an enlarged cross-sectional view of a first embodiment of an interface between a wind turbine blade root and a pitch system according to the system of the invention;
FIG. 5 illustrates a second embodiment of the system of FIG. 4; and
FIG. 6 illustrates a third embodiment of the system of FIG. 4.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 meters in length, having blade root diameters of several meters.

Wind turbine blades 10 are connected to the hub 8 at the root end 16 of the blades 10. In general, a series of mounting elements are provided at the root end 16 of the blade 10, the mounting elements used for coupling to the hub 8. The mounting elements selected may vary for different wind turbine designs, for example the mounting elements may comprise stay bolts or cross-bolts provided at the root end, a projecting blade root flange, and/or blade root bushings embedded in a blade root end to receive bolts. The mounting elements are generally provided in a spaced arrangement around the circumference of the circular blade root end 16, and connect the blade root end either directly to the wind turbine hub 8 or to a blade pitch system provided on the hub 8.

A blade pitch system generally comprises a pair of concentric pitch rings coupled together via a bearing connection, a first pitch ring rotatable relative to a second pitch ring. By mounting the first pitch ring to the root end 16 of a wind turbine blade 10, and mounting the second pith ring to a wind turbine hub 8, the wind turbine blade may be pitched relative to the turbine hub 8, to control wind turbine operation.

With reference to FIG. 4, an enlarged cross-sectional view of a portion of the root end 16 of the wind turbine blade 10 is shown, when connected to a blade pitch system. It will be understood that the cross-section shown is replicated around substantially the entire circumference of the blade root end 16.

A portion of the pitch system is illustrated, in the form of a section of the first pitch ring 70. It will be understood that the first pitch ring 70 is coupled via a plurality of bearings 72 with a second pitch ring (not shown) which is connected to the wind turbine hub 8.

In this embodiment, a plurality of blade root bushings 74 are embedded in the blade root end 16, a free end 74*a* of the bushings 74 projecting from the surface of the root end 16. The bushings 74 are provided with a blind hole 76 to receive a plurality of bolts (not shown), to secure the blade root end 16 to the greater wind turbine structure. However, it will be understood that any suitable mounting element may be used in this invention.

A through-going aperture 78 is provided on the first pitch ring 70, the aperture extending from a first surface 70*a* provided adjacent the root end 16 of the wind turbine blade 10 to a second surface 70*b* provided opposite the first surface 70*a*.

The first pitch ring 70 is provided with a first collar 79 and a second collar 80 located on said first surface 70*a*. The first and second collars 79,80 extend around the circumference of the first pitch ring 70, defining a channel or groove 82 between the collars 79,80 containing the opening of the through-going aperture 78. The collars 79,80 are arranged to receive the free end 74*a* of the blade root bushings 74 in the channel 82, such that the blind holes 76 of the blade root bushings 74 may be aligned with the through-going apertures 78 of the first pitch ring 70, to allow for the coupling of the blade root 16 to the first pitch ring 70.

The collars 79,80 are dimensioned to closely follow the circumference of the notional circle defined by the array of blade root bushings 74, such that any potential deformation or ovalisation of the blade root end 16, and the associated notional circle of bushings 74, will cause the free end 74*a* of at least a portion of the root bushings 74 to bear against the first collar 79 and/or the second collar 80. As the collars 79,80 may be integral with the body of the first pitch ring 70, and are preferably formed from a relatively strong and inflexible material, e.g. steel, the forces driving the blade root end 16 towards ovalisation can be absorbed by the relatively rigid pitch ring structure, and the substantially circular shape of the blade root 16 maintained. Furthermore, as the collars 79,80 essentially force the root bushings 74 to take the circular shape of the first pitch ring 70, the presence of the collars 79,80 also aids in the alignment of the root bushings 74 with the through-going apertures 78 of the pitch ring 70, to provide for an easier mounting operation.

It will be understood that as ovalisation of the root end 16 results in a narrowing of some portions of the circular root end 16 and a lengthening of other sections, a single collar 79,80 may be sufficient to bear the forces of the root end ovalisation effect, as well as aiding in the guiding and alignment of the respective apertures 76,78. Accordingly, the embodiment described may be implemented having either the first collar 79 or the second collar 80 provided on the first pitch ring 70.

As the blade 10 is generally formed from a composite material, and the collars and pitch system are generally formed from a rigid metallic material, any direct contact between the two may result in abrasion or structural faults in the blade root, e.g. microfractures in the main structural laminate of the blade. Furthermore, it is desired that some contact, preferably full contact, be maintained between the free end of the blade root bushings 74 and the first surface 70*a* of the pitch ring 70, so that any bolts mounted in apertures 76,78 do not experience any stresses or strains due to relative movement between the blade root end 16 and the pitch ring 70. Accordingly, the width by which the circular collar 79,80 projects from the first surface 70*a* is preferably selected such that it is less than the distance that the free end 74*a* of the blade root bushing 74 projects from the blade root end 16. This ensures that the bushing free end 74*a* will contact the surface 70*a* of the pitch ring 70 adjacent the open end of the aperture or bore 78, while providing for a defined space between the root end 16 and the respective facing surfaces 79*a*,80*a* of the circular collars 79,80.

In a further enhancement, at least one sealing element 84 may be provided in the area between the surface of the blade root end 16 and the facing surface first and second collars 79,80. The sealing element 84 is provided to prevent the ingress of moisture or other particles, e.g. dirt, into the interior of the wind turbine construction through the space defined between the root end 16 and the opposed facing surfaces 79*a*,80*a* of the circular collars 79,80. The sealing element 84 may be provided as a ring extending around the circumference of one or both of the circular collars 79,80.

In a further aspect, a spacer element (not shown) may be provided between the root end 16 and said opposed faces 79*a*,80*a*, preferably in the form of an o-ring around individual root bushings 74 or as a buffer layer provided on top of the first and second collars 79,80. The use of such a spacer element may help to prevent direct contact between the blade root end 16 and the pitch system of the wind turbine.

In a further possible enhancement not illustrated here, at least one of the first and second collars 79,80 may comprise a tapered or chamfered surface towards the channel 82 comprising the through-going aperture 78, to aid in the insertion of the root bushings 84 into the channel 82.

In a preferred aspect, the circular collars 79,80 are arranged such that the respective bolt apertures 76,78 are accurately aligned, when various tolerances are considered, to ensure that any bolts received in said apertures 79,80 are not subjected to stresses and strains as a result of misalignment between the bores. Accordingly, it is preferred that the apertures 76,78 are aligned to prevent the bolts touching surfaces of the blade root end-pitch interface which can lead to bolt failure.

In one aspect, assuming that the centre of the mounted bolt is aligned with the centre of the root bushing bore 76, the bolt should be aligned with the centre of the hole 78 in the pitch ring. The diameter difference between the bolt thread and the hole 78 in the pitch ring is then the maximum co-axiality tolerance between the two.

Assuming the external diameter of the free end 74a of the bushing 74 is running with the centreline of the mounted bolt, the following dimensions can be derived:

The maximum diameter of the external collar 79 is then:

Blade bolt circle diameter (BCD)+blade bushing external end diameter+the max co-axiality tolerance−X, to avoid bolt touching.

The minimum diameter of the internal collar 80 is then:

Blade BCD−blade bushing external end diameter−the max co-axiality tolerance+X, to avoid bolt touching.

It will be understood that X is a tolerance value selected to allow for acceptable manufacturing variations, e.g. X can be based on the root bushing 74 alignment in the root end 16, the thickness of the walls of the root bushing 74, the thickness and rigidity of the bolts used, and/or the alignment of the apertures or bores 78 provided on the pitch ring 70. Preferably, X is between 0.1-0.9 mm.

With reference to FIG. 4, preferably the circular collar 79 or 80 is spaced from the open end of the pitch system bore 78 by a distance which allows for maximum certainty that any misalignment of the bores 76 and 78 is within acceptable tolerances.

While the embodiment of FIG. 4 illustrates the collars 79,80 provided as integral with the first pitch ring 70, it will be understood that different implementations of the invention may be used to provide for improved handling of blade root ovalisation. With reference to FIGS. 5 and 6, second and third embodiments of the invention are shown, wherein the invention may be implemented using a standard pitch ring with limited modifications. It will be understood that the description and reference numerals used for FIG. 4 are also used in respect of FIGS. 5 and 6 for the corresponding components.

In FIG. 5, the first and second collars are provided in the form of first and second collar ring members 86,88, which are attached to the first surface 70a of the first pitch ring 70, preferably bolted to the pitch ring using bolts 90. The collar ring members 86,88 are arranged to form the channel or groove 82 as shown in FIG. 4, for receiving the free ends 74a of the blade root bushings 74.

In FIG. 6, the first and second collars are provided in the form of first and second collar bands 92,94, the bands 92,94 dimensioned to couple to the first pitch ring 70 via a push-fit connection at the first surface 70a of the pitch ring 70. Accordingly, the collar bands 92,94 form the channel or groove 82 as shown in FIG. 4, without any mechanical coupling to the pitch ring 70.

As with the embodiment of FIG. 4, it will be understood that the embodiments of FIGS. 5 and 6 may also be implemented with only a single collar 86,88,92,94, and/or may also utilise at least one sealing element 84 and/or a spacer.

In a further enhancement of the invention it will be further understood that the first pitch ring 70 may be modified to reinforce the pitch ring, e.g. a cross-brace or bracket may be provided between opposed sides of the pitch ring to prevent deformation.

The invention provides a system and method to ensure correct alignment, preferably radial alignment, between a blade root bolt circle and a hub-side bolt circle, e.g. a pitch system bolt circle. By ensuring accurate alignment of components, the possibility of premature bolt failure during the wind turbine operational lifetime is greatly reduced. Through the use of the above described invention, the stiffness of the pitch ring is effectively used to secure the blade root roundness. Accordingly, such a system does not require the use of a relatively heavy-duty blade root flange to maintain the circular shape of the blade root. The present invention provides for a considerable reduction in the effect of blade root ovalisation, leading to a lesser probability of failure of wind turbine components due to such ovalisation.

The invention is not limited to the embodiment described herein, and may be modified or adapted without departing from the scope of the present invention.

The invention claimed is:

1. A wind turbine comprising a rotor having a substantially horizontal rotor shaft, the rotor comprising a hub and at least one wind turbine blade extending in a substantially radial direction therefrom, the wind turbine blade having a tip end and a substantially circular root end, wherein a plurality of bushings project from said root end of said at least one wind turbine blade for mounting said at least one wind turbine blade to a hub, an extender, or a pitch ring coupled to said rotor, wherein a corresponding plurality of apertures are defined on a mounting surface of said hub, extender, or pitch ring, the apertures and the bushings arranged to receive a plurality of bolts to mount said at least one wind turbine blade to said hub, extender, or pitch ring, wherein said wind turbine comprises at least one guiding surface extending adjacent said apertures, the guiding surface acting to align said bushings with said apertures such that a free end of said bushings bear against the mounting surface adjacent said apertures, and wherein said guiding surface is substantially orthogonal to said mounting surface.

2. The wind turbine of claim 1, wherein said bushings project from the root end of said at least one wind turbine blade by a first height, and said guiding surface is provided by at least one circular collar, wherein said circular collar projects from the mounting surface by a second height, wherein said first height is greater than said second height, such that a space is defined between said root end and said at least one circular collar.

3. The wind turbine of claim 1, wherein at least one resilient seal or spacer element is provided between the root end of said at least one blade and said guiding surface.

4. The wind turbine of claim 3, wherein said at least one resilient seal or spacer element comprises a rubber ring or a flexible tube applied on the circular collar or on the blade root end.

5. The wind turbine of claim 1, wherein the wind turbine blade is substantially formed from a fibre composite material, and the circular collar and hub, extender, or pitch ring are substantially formed from a metallic material.

6. The wind turbine of claim 1, wherein a portion of the guiding surface is chamfered, preferably that portion of the guiding surface distal from said mounting surface.

7. The wind turbine of claim 6, wherein the chamfered portion of said guiding surface is less than 50% of the height of the guiding surface.

8. The wind turbine of claim 1, wherein the wind turbine comprises an inner circular collar located internal to the circumference of a notional circle defined by said plurality of bushings projecting from the substantially circular blade root end, said inner circular collar acting to bear against at least a portion of said plurality of bushings to retain the substantially circular shape of said root end and prevent ovalisation of said root end.

9. The wind turbine of claim 1, wherein the wind turbine comprises an outer circular collar located external to the circumference of a notional circle defined by said plurality of bushings projecting from the substantially circular blade root end, said outer circular collar acting to bear against at least a portion of said plurality of bushings to retain the substantially circular shape of said root end and prevent ovalisation of said root end.

10. A method for preventing ovalisation of a wind turbine blade root end, the wind turbine blade comprising a substantially circular root end having a plurality of bushings projecting therefrom, the method comprising the steps of:
   providing a mounting surface to which said bushings are arranged to couple with, and
   providing at least one collar, preferably a circular collar, having a guiding surface to bear against and align at least a portion of said plurality of bushings projecting from said root end, to retain the substantially circular shape of said root end and prevent ovalisation of said root end, wherein said guiding surface is substantially orthogonal to said mounting surface.

* * * * *